US011528057B2

(12) United States Patent
Eguchi

(10) Patent No.: US 11,528,057 B2
(45) Date of Patent: Dec. 13, 2022

(54) WIRELESS TRANSMISSION SYSTEM

(71) Applicant: CANON KABUSHIKI KAISHA, Tokyo (JP)

(72) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/525,701

(22) Filed: Nov. 12, 2021

(65) Prior Publication Data

US 2022/0158691 A1 May 19, 2022

(30) Foreign Application Priority Data

Nov. 17, 2020 (JP) .............................. JP2020-191174

(51) Int. Cl.
| | | |
|---|---|---|
| *H04B 5/00* | (2006.01) | |
| *H04B 5/02* | (2006.01) | |
| *H01L 41/107* | (2006.01) | |
| *H01L 41/22* | (2013.01) | |
| *G02F 1/225* | (2006.01) | |
| *H01Q 7/00* | (2006.01) | |
| *H04L 25/02* | (2006.01) | |

(52) U.S. Cl.
CPC ............ *H04B 5/0031* (2013.01); *H01Q 7/00* (2013.01); *H04B 5/02* (2013.01); *H04L 25/0272* (2013.01)

(58) Field of Classification Search
None
See application file for complete search history.

(56) References Cited

U.S. PATENT DOCUMENTS

| | | | | |
|---|---|---|---|---|
| 4,238,733 A * | 12/1980 | Freeman | ............... | H02K 11/20 324/536 |
| 6,420,842 B1 * | 7/2002 | Gold | ..................... | H02K 55/04 318/141 |
| 6,441,699 B2 * | 8/2002 | Yamada | ................. | H01P 5/188 333/116 |
| 7,218,012 B1 * | 5/2007 | Edenfeld | .................. | F03D 9/25 290/55 |
| 7,663,462 B2 * | 2/2010 | Makuth | .................. | H01F 38/18 336/130 |
| 8,041,225 B2 * | 10/2011 | Hemmelmann | ....... | G08C 23/04 250/208.2 |
| 8,369,780 B2 * | 2/2013 | Bauer | ..................... | H04B 5/00 307/104 |

(Continued)

FOREIGN PATENT DOCUMENTS

JP   H0445505 A   2/1992

*Primary Examiner* — Tuan A Tran
(74) *Attorney, Agent, or Firm* — Canon U.S.A., Inc. IP Division

(57) ABSTRACT

A wireless transmission system includes a first transmission line coupler including a pair of signal lines for differential signal transmission with a first end of each signal line connected to a reception unit and another end of each signal line connected to a termination resistor; a second transmission line coupler being shorter than the first transmission line coupler and contactlessly facing the first transmission line coupler to communicate an electric signal with the first transmission line coupler using electric field and/or magnetic field coupling; and a metal plate covering at least a part of a portion of the first transmission line coupler that does not face the second transmission line coupler.

11 Claims, 10 Drawing Sheets

(56) References Cited

U.S. PATENT DOCUMENTS

| | | | | |
|---|---|---|---|---|
| 8,437,639 | B2* | 5/2013 | Labonville | A61B 34/74 |
| | | | | 250/551 |
| 9,209,570 | B2* | 12/2015 | Toba | H01R 13/648 |
| 9,312,925 | B2* | 4/2016 | Kusaka | H04B 5/0031 |
| 9,537,540 | B2* | 1/2017 | Graf | H04B 5/0037 |
| 9,859,994 | B2* | 1/2018 | Steffens | H04B 17/27 |
| 9,862,338 | B2* | 1/2018 | Bauer | H02J 50/80 |
| 10,093,491 | B2* | 10/2018 | Tam | H01L 21/67144 |
| 10,361,591 | B2* | 7/2019 | Widmer | B60L 53/126 |
| 10,483,805 | B2* | 11/2019 | Kahlman | H02J 50/10 |
| 10,558,104 | B2* | 2/2020 | Williams | G02F 1/2257 |
| 10,984,947 | B2* | 4/2021 | Grünberg | H04B 5/0037 |
| 11,057,078 | B2* | 7/2021 | Tamaki | H04B 5/0012 |
| 2010/0148505 | A1* | 6/2010 | Dunlap | H01F 38/18 |
| | | | | 336/120 |
| 2010/0285747 | A1* | 11/2010 | Bauer | H01F 38/14 |
| | | | | 307/104 |
| 2013/0134838 | A1* | 5/2013 | Yun | H01L 41/047 |
| | | | | 29/25.35 |
| 2016/0127052 | A1* | 5/2016 | Steffens | H04B 17/16 |
| | | | | 455/67.14 |
| 2017/0030741 | A1* | 2/2017 | Lin | G01D 5/24 |
| 2018/0334050 | A1* | 11/2018 | Widmer | B60L 53/126 |
| 2020/0328775 | A1* | 10/2020 | Asai | H04B 1/38 |

* cited by examiner

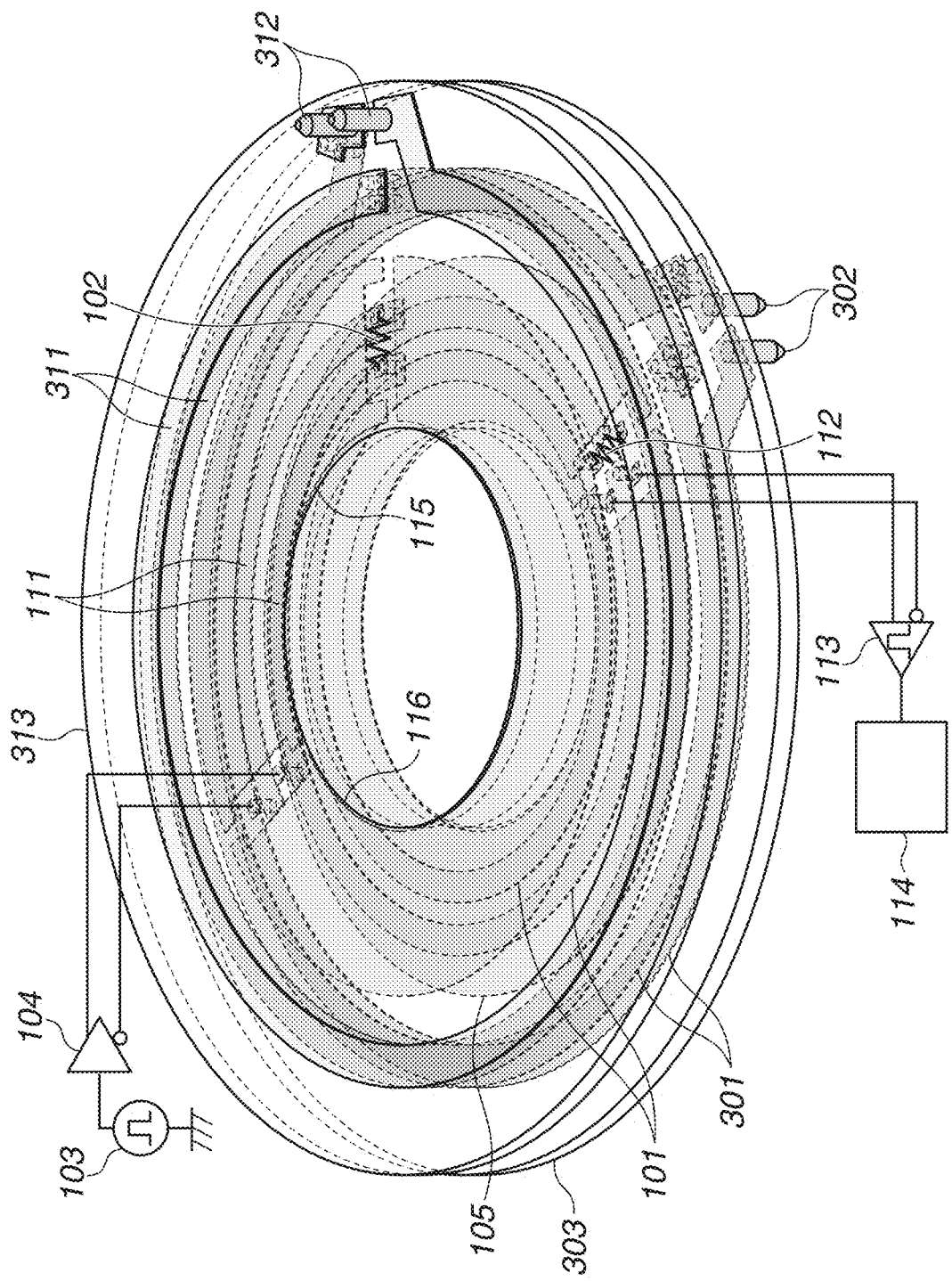

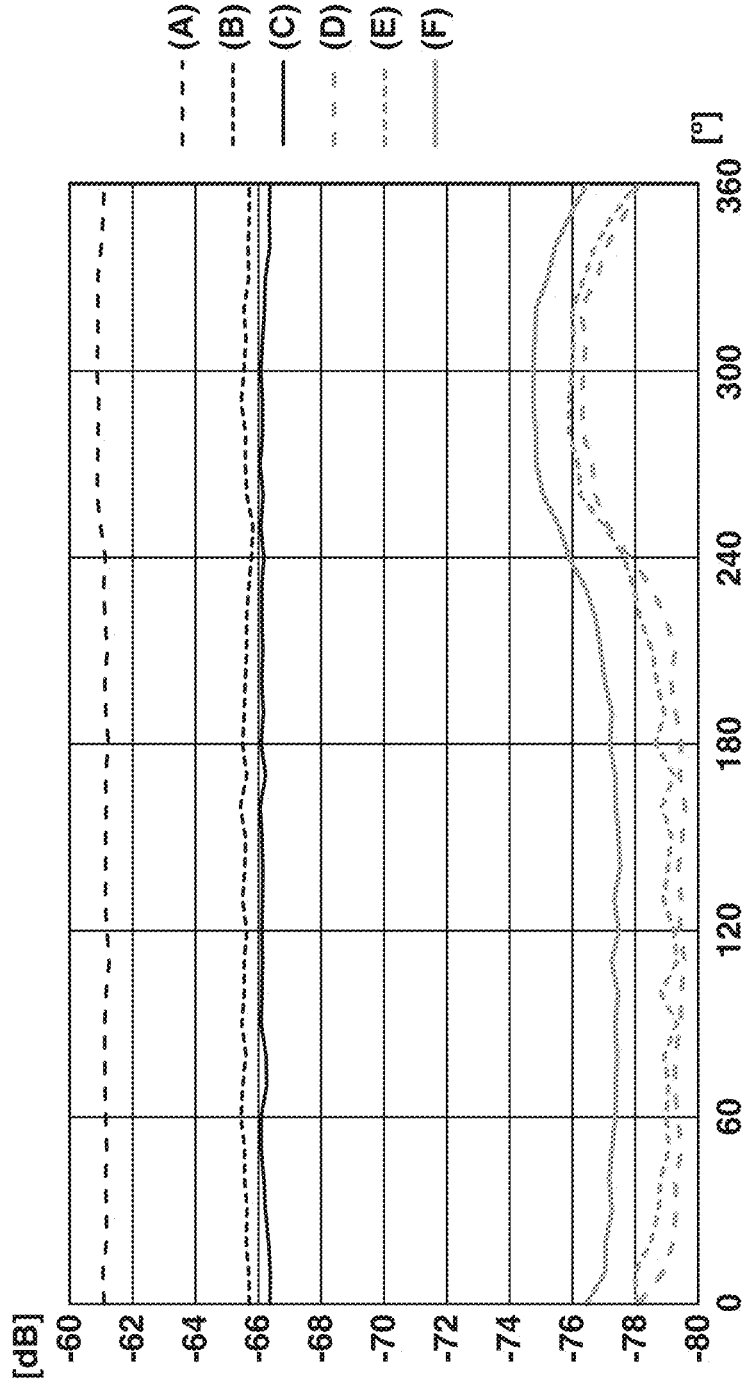

WIRELESS TRANSMISSION SYSTEM

BACKGROUND

Field

The present disclosure relates to a wireless transmission system including a movable transmission line.

Description of the Related Art

In recent years, techniques for controlling, via communication, a device including a rotatable and movable unit such as a robot hand unit or a network camera have been developed. Controlling a device including a rotatable and movable unit via wired communication may cause an issue that a cable and a shaft are tangled together when the rotatable and movable unit is rotated. As a solution to this issue, a configuration that enables wireless data communication via the rotatable and movable unit is sometimes employed. Japanese Patent Application Laid-Open No. 4-45505 discusses a configuration in which a signal is detected from a second transmission line facing a ring-shaped first transmission line having a first end that is terminated and another end to which an electric signal is input.

In some systems that perform wireless data communication, not only data but also power are transmitted wirelessly via the rotatable and movable unit to realize complete wireless communications. In some such systems, wireless communication is performed using a bandwidth of tens of megahertz and higher, whereas wireless power transmission is performed using a bandwidth of ten megahertz and lower. In such systems, since the frequency range for wireless power transmission and the frequency range for data transmission do not overlap, wireless power transmission and data transmission can be separated using a filter. However, since the power for wireless power transmission is one hundred times the power for wireless communication, wireless data communication is often affected by wireless power transmission despite the use of a filter.

FIG. 7A is a diagram illustrating a configuration of a coupler that performs communication via a transmission line using a differential microstrip line. A first transmission line coupler 101 is arranged across nearly an entire region over a circumference, and a first end and another end of the first transmission line coupler 101 are arranged close to each other. A signal source 103 is connected to the first end of the first transmission line coupler 101 via a differential buffer 104, and a termination resistor 102 is connected to the other end of the first transmission line coupler 101. A second transmission line coupler 111 is arranged to face the first transmission line coupler 101. A comparator 113 and a reception unit 114 are connected to n first end of the second transmission line coupler 111. Further, a termination resistor 112 is connected to another end of the second transmission line coupler 111. A signal input to the first transmission line coupler 101 is transmitted to the second transmission line coupler 111 via electric field and/or magnetic field coupling to perform wireless communication.

The foregoing communication using transmission line couplers is still established even when the signal input/output relationship between the transmission line couplers 101 and 111 is switched as illustrated in FIG. 7B.

The second transmission line coupler 111 is sandwiched between a metal (hereinafter, "second ground") 115 to be a reference voltage of the second transmission line coupler 111 and a metal (hereinafter, "first ground") 105 to be a reference voltage of the first transmission line coupler 101. Meanwhile, a portion of the first transmission line coupler 101 that faces the second transmission line coupler 111 is sandwiched between the first ground 105 and the second ground 115. By contrast, another portion of the first transmission line coupler 101 that does not face the second transmission line coupler 111 is neighbored only by the first ground 105, and the opposite side is a free space.

In the other portion of the first transmission line coupler that does not face the second transmission line coupler, exogenous noise in power transmission may be mixed through the free space, thereby decreasing a signal-noise (SN) ratio in data communication.

SUMMARY OF THE DISCLOSURE

Various embodiments in the present disclosure are directed to suppressing a decrease in a signal-noise (SN) ratio that is caused by noise mixture in a case where a first transmission line coupler and a second transmission line coupler shorter than the facing first transmission line coupler communicate wirelessly with each other.

According to various embodiments of the present disclosure, a wireless transmission system includes a first transmission line coupler having a first end connected to a transmission unit or a reception unit and another end connected to a termination resistor, a first ground to be a reference potential corresponding to the first transmission line coupler, a second transmission line coupler having a first end connected to a reception unit or a transmission unit and another end connected to a termination resistor, the second transmission line coupler being shorter than the first transmission line coupler and contactlessly facing the first transmission line coupler to communicate an electric signal with the first transmission line coupler using electric field and/or magnetic field coupling, a second ground to be a reference potential corresponding to the second transmission line coupler, and a metal plate covering at least a part of a portion of the first transmission line coupler, the portion not facing the second transmission line coupler, wherein, in a case where the transmission unit is connected to the first end of the first transmission line coupler, the reception unit is connected to the first end of the second transmission line coupler, whereas, in a case where the reception unit is connected to the first end of the first transmission line coupler, the transmission unit is connected to the first end of the second transmission line coupler.

Further features of the present disclosure will become apparent from the following description of example embodiments with reference to the attached drawings.

BRIEF DESCRIPTION OF THE DRAWINGS

FIG. 3 is a diagram illustrating a system configuration of the wireless transmission system according to the first example embodiment that further includes a coil for wireless power transmission.

FIG. 4 is a graph illustrating wireless power interference intensities at a coupled end of the wireless transmission system according to the first example embodiment.

DESCRIPTION OF THE EMBODIMENTS

Various example embodiments of the present disclosure will be described in detail below with reference to the attached drawings. Each configuration described in the following example embodiments is a mere example, and the present invention is not limited to the illustrated configurations.

Figure 8:
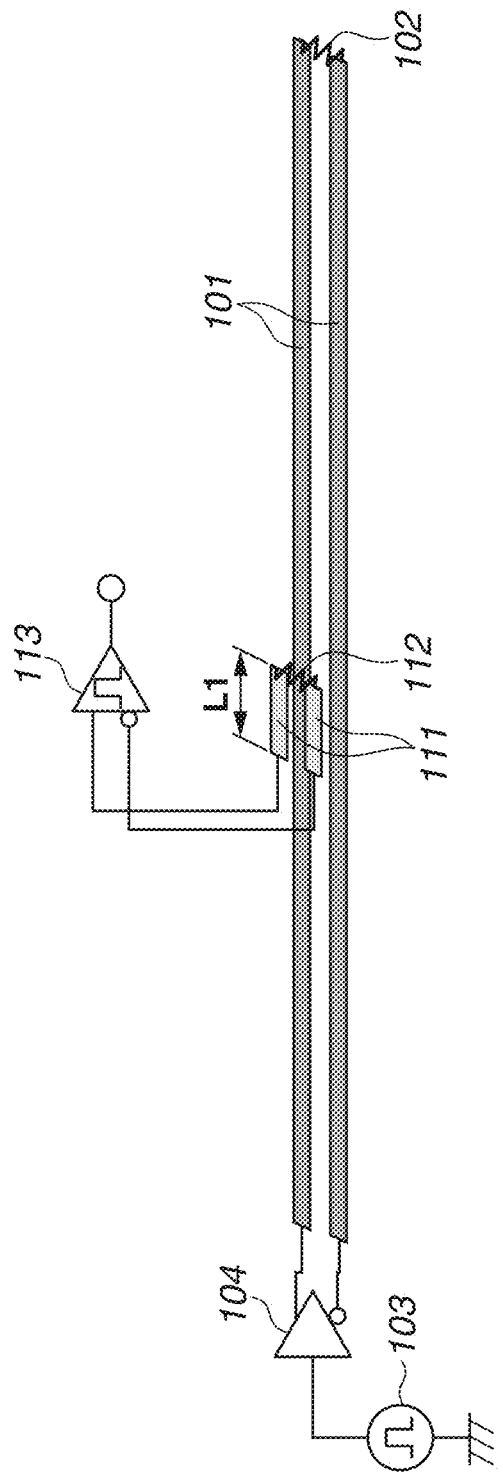
FIG. 8 is a diagram illustrating a system configuration for describing a common principle of the example embodiments.

First, a common principle of various example embodiments will be described below. FIG. 8 is a system configuration diagram illustrating the common principle of the various example embodiments. A transmission line coupler 101 is a transmission line coupler of a differential signal transmitting side and includes a pair of signal lines. Hereinafter, the transmission line coupler 101 will be referred to as a "transmission coupler". Data transmitted from a signal source (transmission unit) 103 connected to the transmission coupler 101 is transmitted through a differential buffer 104 connected to the signal source 103 so that the data is input as a differential signal to the transmission coupler 101. A first end of the transmission coupler 101 that is opposite to another end connected to the signal source 103 is terminated by a termination resistor 102. The termination resistor 102 is substantially equal to a characteristic impedance of a transmission line.

A transmission line coupler 111 is a transmission line coupler of a differential signal receiving side and includes a pair of signal lines. Hereinafter, the transmission line coupler 111 will be referred to as a "reception coupler". The reception coupler 111 can move along the transmission coupler 101. The reception coupler 111 is coupled to the transmission coupler 101 by an effect of at least one of an electric field and/or a magnetic field. An input signal that is input from the signal source 103 is transmitted through the electric field and/or magnetic field coupling of the transmission coupler 101 and the reception coupler 111 and is output from a first end of the reception coupler 111 to a comparator 113. The waveform of the signal output from the reception coupler 111 is shaped by the comparator 113, and the resulting signal is detected as a reception signal. Another end of the reception coupler 111 is terminated by a termination resistor 112. The termination resistor 112 is substantially equal to the characteristic impedance of the transmission line.

The transmission coupler 101 and the reception coupler 111 operate as a directional coupler. An end of the reception coupler 111 that is on the same side as the end of the transmission coupler 101 that is connected to the signal source 103 will be referred to as a "coupled end" and another end as an "isolation end".

Figure 9:
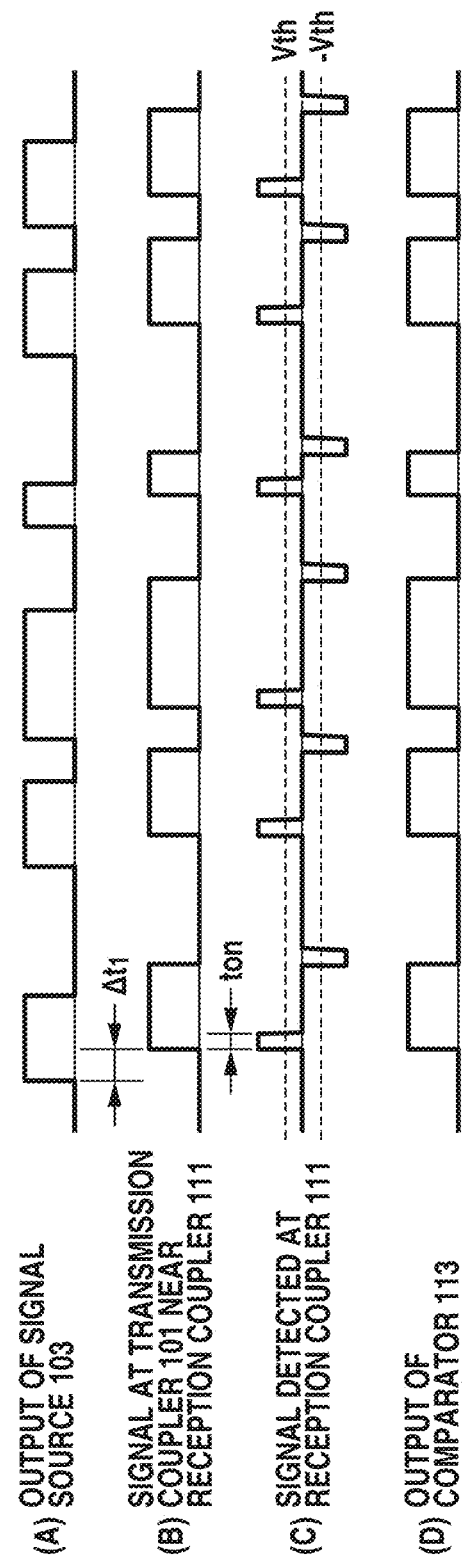
FIG. 9 is a timing chart for describing a common principle of the example embodiments.

FIG. 9 is a timing chart for describing a common principle of the various example embodiments. In FIG. 9, a signal (A) indicates a signal that is output from the signal source 103, i.e., a signal that is input to the transmission coupler 101. A signal (B) in FIG. 9 indicates a signal at a position of the transmission coupler 101 that faces the reception coupler 111. Further, a signal (C) in FIG. 9 indicates a signal that is output from the coupled end in a case where the isolation end of the reception coupler 111 is terminated and a signal is output from the coupled end. A signal (D) in FIG. 9 indicates a signal that is output from the comparator 113.

As illustrated in FIG. 9, the signal that is output from the coupled end of the reception coupler 111 rises when the signal input to the transmission coupler 101 rises when transmitted to a position under the reception coupler 111. Further, the rise of the signal is maintained for the length by which the transmission coupler 101 and the reception coupler 111 are coupled together, i.e., the time that is substantially proportional to a length L1 of the reception coupler 111 illustrated in FIG. 8, and thereafter the signal returns to substantially zero.

In a case where the coupled end of the reception coupler 111 is terminated and the signal is captured from the isolation end, the captured signal is a signal that is similar to a differentiated waveform and rises when the signal input to the transmission coupler 101 rises when transmitted to a position under the reception coupler 111. In various of the following example embodiments, a signal can be captured from either one of the coupled end and the isolation end of the reception coupler 111.

Figure 10:
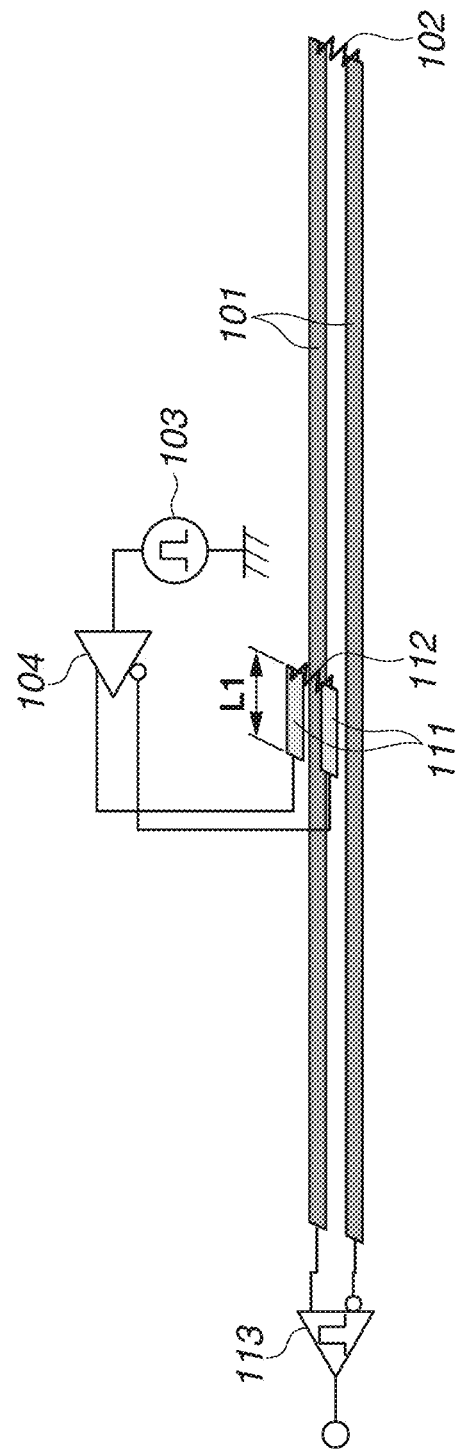
FIG. 10 is a diagram illustrating another system configuration for describing a common principle of the example embodiments.

FIG. 10 illustrates a system configuration different from FIG. 8. Specifically, a long transmission line coupler is a reception coupler, and a short transmission line coupler is a transmission coupler. The transmission coupler 111 is configured to move along the reception coupler 101. Since a directional coupler is reversible, wireless communication as illustrated in FIGS. 8 and 9 is realized even in a case where the roles of transmission and reception of the transmission line couplers are switched as illustrated in FIG. 10. In FIG. 10, each component having a similar role to that of the corresponding component in the system configuration in FIG. 8 is given the same reference numeral as that of the corresponding component.

In various example embodiments, the system configuration illustrated in FIG. 8 or 10 is applied to a rotating body. The long transmission line coupler is arranged over a circumference of the rotating body. Further, the facing short transmission line coupler is arranged outside, inside, immediately above, or immediately under the circumference of the rotating body adjacently to the long transmission line coupler to perform signal transmission and/or reception. In various example embodiment, a configuration with the short transmission line coupler arranged immediately above the long transmission line coupler is described as an example. The short transmission line coupler and the long transmission line coupler perform wireless communication by electric field and/or magnetic field coupling.

In a case where the long transmission line coupler and the short transmission line coupler perform wireless communication by electric field and/or magnetic field coupling, the transmission line coupler that has a free space on the transmission line is the long transmission line coupler. Thus, a noise source is at the short transmission line coupler when viewed from the long transmission line coupler, and a case where signal is transmitted from the short transmission line coupler to the long transmission line coupler will be described below.

Components of a wireless communication system described in various of the following example embodiments can be included in a single device, or one or some of the components can be included in a different device. For example, a transmitting-side transmission line coupler and a receiving-side transmission line coupler can be included in different devices from each other. Specifically, a system configuration in which the transmitting-side transmission line coupler is provided to a cylindrical shaft of a first device and the receiving-side transmission line coupler is provided to a second device including a member that fits the shaft can be employed. In this case, the shaft of the first device and the member of the second device are fitted together to enable communication between the transmitting-side transmission line coupler and the receiving-side transmission line coupler.

Figure 1:
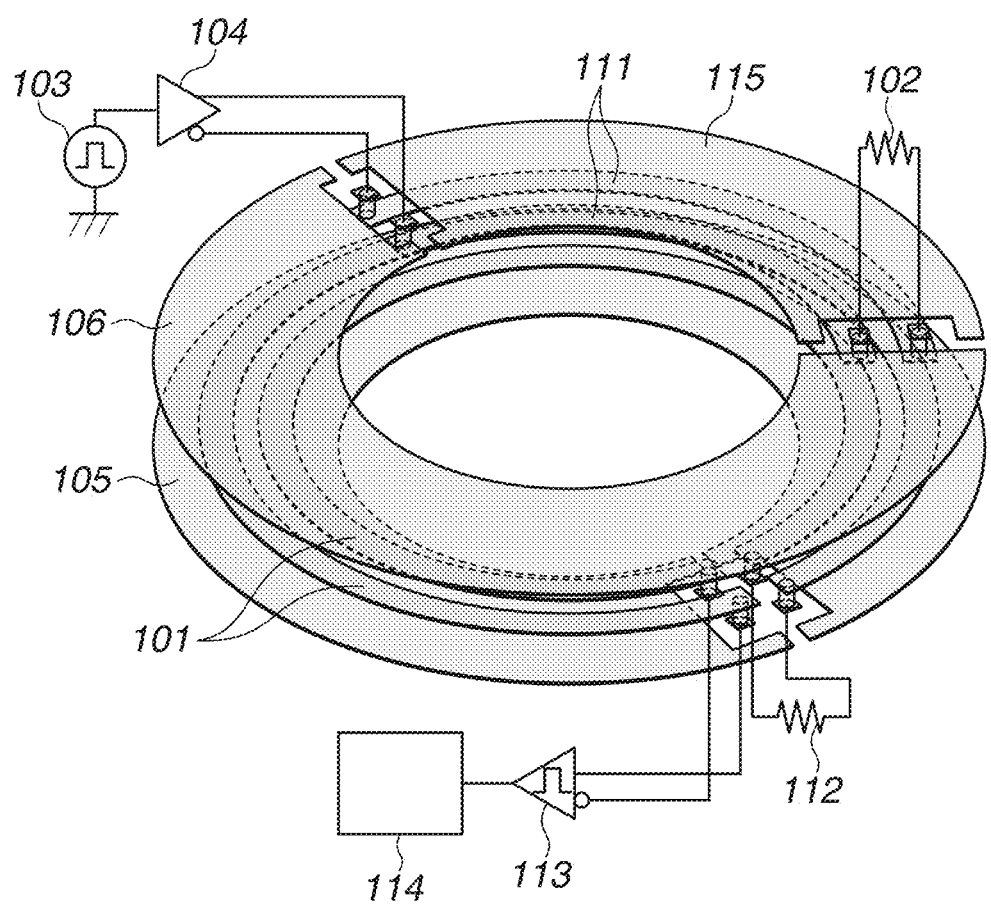
FIG. 1 is a diagram illustrating a system configuration of a wireless transmission system according to a first example embodiment.

FIG. 1 illustrates a system configuration of a wireless transmission system according to a first example embodiment. The transmission line coupler 101, which is the longer one, is a signal receiving side and will be referred to as a "reception coupler 101" hereinafter. Further, the transmission line coupler 111, which is the shorter one, is a signal transmitting side and will be referred to as a "transmission coupler 111" hereinafter.

The reception coupler 101 is an arc-shaped transmission line covering most of the circumference. A reception unit 114 is connected to one end of a gap of the reception coupler 101 via the comparator 113. The reception unit 114 receives input signals. The termination resistor 112 is connected to another end of the reception coupler 101.

The transmission coupler 111 is a transmission line that is arranged to face the reception coupler 101 and is configured to rotate about the same axis as the reception coupler 101 and cover a part of the circumference. The signal source 103 is connected to an end of an arc-shaped of the transmission coupler 111 via the differential buffer 104. Further, the termination resistor 102 is connected to another end of the transmission coupler 111. A signal output from the signal source 103 travels in a direction of the termination resistor 102 through the transmission coupler 111 and flows into the termination resistor 102. The transmission coupler 111 consists of a differential microstrip line. Further, at least a part of a portion of an opposite surface of the transmission coupler 111 to a surface facing the reception coupler 101 that faces a transmission line of the transmission coupler 111 is covered with a metal plate 115 of a ground to be a reference voltage.

Furthermore, according to the present example embodiment, at least a part of a portion of a surface extending from the transmission coupler 111 and facing the reception coupler 101 that does not face the transmission line of the transmission coupler 111 is covered with a metal plate 106 of a ground to be a reference voltage. The portion of the surface that faces the reception coupler 101 and where the transmission coupler 111 is absent is covered with the metal plate 106 to prevent a state where a top surface of the reception coupler 101 is a free space or is covered only with a dielectric. This prevents external noise from entering the reception coupler 101. The transmission line couplers 101 and 111 and the metal plates 115 and 106 that are grounds consist of a pattern on a flame retardant type 4 (FR-4) electric substrate.

Like the transmission coupler 111, a portion of an opposite surface of the reception coupler 101 to a surface facing the transmission coupler 111 that faces the transmission line of the reception coupler 101 is covered with the metal plate 115 of a ground to be a reference voltage.

Figure 2:
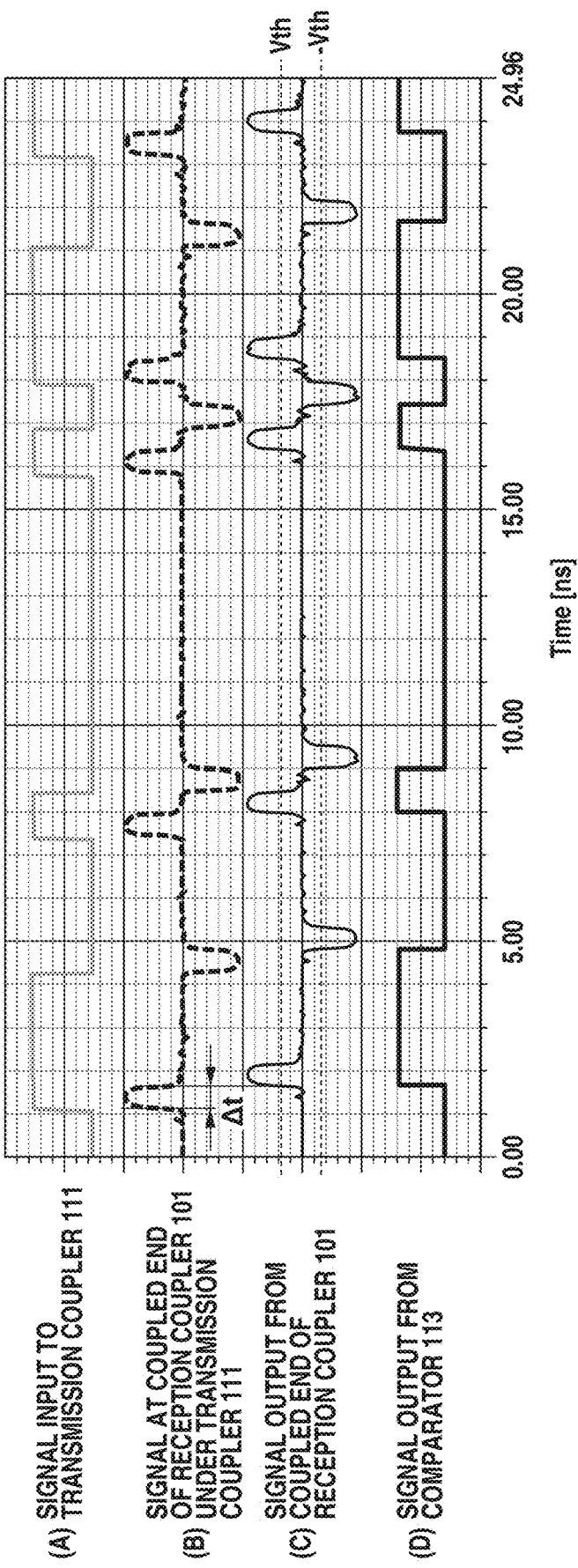
FIG. 2 is a timing chart of the wireless transmission system according to the first example embodiment.

FIG. 2 is a timing chart of the wireless transmission system according to the present example embodiment. A signal transmitted through the transmission coupler 111 and a signal detected from the reception coupler 101 are differential signals, but for simplification of illustration, a difference signal of the differential signals is illustrated.

In FIG. 2, a signal (A) is a signal that is output from the signal source 103, i.e., a signal that is input to the transmission coupler 111. A signal (B) in FIG. 2 is a signal at a coupled end of the reception coupler 101 at a position facing the transmission coupler 111. A signal (C) in FIG. 2 is a signal that is output from the coupled end of the reception coupler 101. A signal (D) in FIG. 2 is a signal that is output from the comparator 113. At an isolation end of the reception coupler 101 at a position facing the transmission coupler 111, a signal similar to a differentiated waveform of the signal (A) is generated.

The signal (B) is an edge signal of the input signal (A). The signal (B) rises at a rise of the signal (A), is maintained at a level for a time that is substantially proportional to the length of the transmission coupler 111, and is then restored to an original signal level. Further, the signal (B) falls at a fall of the signal (A), is maintained at the level for a time that is substantially proportional to the length of the transmission coupler 111, and is then restored to the original signal level.

The signal (C) is a signal that is output from the coupled end of the reception coupler 101 and is delayed by time Δt during which the signal (B) is transmitted on the reception coupler 101. In a case where the transmission coupler 111 is close to the coupled end of the reception coupler 101, time Δt is short, whereas in a case where the transmission coupler 111 is close to the isolation end of the reception coupler 101, time Δt is long.

The comparator 113 has a hysteresis so that in a case where the output signal (C) from the coupled end of the reception coupler 101 is higher than or equal to a positive threshold voltage Vth, the comparator 113 outputs "1", whereas in a case where the output signal (C) is lower than or equal to a negative threshold voltage −Vth, the comparator 113 outputs "0".

In the edge signal (C), noise such as a reflected wave is generated due to a disturbance in characteristic impedance of the reception coupler 101 by an effect of the transmission coupler 111 or due to an inconsistency between the characteristic impedance of the reception coupler 101 and the termination resistor 102. However, in a case where the noise signals are within the threshold voltages (Vth, −Vth), the comparator 113 only changes a rise or a fall of the edge signal (C). Thus, a signal that is the same as the signal (A) and is delayed by time Δt is demodulated as the signal (D).

FIG. 3 is a diagram illustrating a system configuration of the wireless transmission system according to the present example embodiment that further includes a coil for wireless power transmission. With a rotation axis of the transmission coupler 111 and the reception coupler 101 of the wireless transmission system illustrated in FIG. 1 at the center, the wireless transmission system illustrated in FIG. 1 is arranged inside, and the coil for wireless power transmission is arranged outside the wireless transmission system.

The reception coupler 101, the termination resistor 112, the comparator 113, the reception unit 114, and a metal plate 105 are similar to those in FIG. 1. Further, the transmission coupler 111, the termination resistor 102, the signal source 103, the differential buffer 104, and the metal plate 115 are also similar to those in FIG. 1. A metal plate 116, which is similar to the metal plate 106 in FIG. 1, is arranged.

In the wireless transmission system illustrated in FIG. 3, each transmission line coupler and each coil for wireless power consist of a pattern on a FR-4 substrate. A power transmission coil 311 consists of a pattern on an electric substrate 313. According to the present example embodiment, the power transmission coil 311 is a coil formed by connecting patterns on both sides of the electric substrate 313 to each other through via-holes. Alternating power is supplied from a power-input pin 312 to the power transmission coil 311.

A power reception coil 301 consists of a pattern on an electric substrate 303. According to the present example embodiment, the power reception coil 301 is a coil formed by connecting patterns on both sides of the electric substrate 303 to each other through via-holes. A power-output pin 302 is connected to the power reception coil 301. In the wireless transmission system illustrated in FIG. 3, wireless power transmission is performed by transmitting power from the power transmission coil 311 to the power reception coil 301.

While FIG. 3 illustrates the configuration in which the coils for power and the transmission line couplers for communication consist of patterns on the same substrate, this is not a limiting configuration, and the coils for power do not have to consist of a pattern on a substrate. Further, while the coils for power consist of the patterns on both sides of the substrates in FIG. 3, a pattern on an inner layer of a multi-layer substrate can be used.

FIG. 4 illustrates graphs (A) to (C) indicating intensities of interference signals output from the reception coupler 101 in the wireless transmission system illustrated in FIG. 3. Each interference signal is 2 MHz alternating power input from the power-input pin 312. The vertical axis indicates an interference signal intensity, and the horizontal axis indicates a relative angle of the transmission coupler 111 and the reception coupler 101.

The graph (A) indicates interference intensities in a case where the metal plate 116 is absent in the wireless transmission system illustrated in FIG. 3. The graph (B) is a graph indicating interference intensities in a case where the metal plate 116 is present in the wireless transmission system illustrated in FIG. 3. The graph (C) is a graph indicating interference intensities in a case where the metal plate 116 is connected to the metal plate 115 to be a reference voltage of the transmission coupler 111 in the wireless transmission system illustrated in FIG. 3.

As illustrated in FIG. 4, the interference intensities in the case where the metal plate 116 is absent in the wireless transmission system illustrated in FIG. 3 (graph (A)) are about −61 dB, whereas the interference intensities in the case where the metal plate 116 is present in the wireless transmission system illustrated in FIG. 3 (graph (B)) are reduced to about −65.7 dB. Thus, the interference signal is reduced by 4 dB or more by providing the metal plate 116 to the portion of the reception coupler 101 that does not face the transmission coupler 111 in the wireless transmission system illustrated in FIG. 3. Further, in the case where the metal plate 116 is connected to the metal plate 115 to be a reference voltage (graph (C)), the interference intensities of the interference signals are further reduced by about 0.5 dB.

As described above, according to the present example embodiment, a portion of a long transmission line coupler that does not face a short transmission line coupler in a wireless transmission system that wirelessly transmits not only a signal but also power is covered with a metal plate to reduce an interference signal. This prevents mixture of an external interference signal in wireless power transmission that generates noise in wireless communication, thereby suppressing a decrease in a signal-noise (SN) ratio in wireless communication.

Further, the metal plate facing the portion of the long transmission line coupler that does not face the short transmission line coupler is connected to another metal plate (ground) to be a reference voltage to further reduce an interference signal.

Contrary to FIG. 3, the graphs (D) to (F) in FIG. 4 indicate interference signal intensities in a case where a signal is input to the reception coupler 101 and the signal is output from the transmission coupler 111. The graph (D) indicates interference intensities in a case where the metal plate 116 is absent. The graph (E) indicates interference intensities in a case where the metal plate 116 is present. The graph (F) indicates interference intensities in a case where the metal plate 116 is connected to the metal plate 115 to be a reference voltage of the transmission coupler 111.

Since the metal plate 105 to be a reference potential of the reception coupler 101 covers nearly the entire circumference, the interference signal intensity is low.

In a case where a noise source is at a coupler that is arranged across the entire circumference as described above, an interference signal is reduced. However, whether a noise source is at a transmission coupler or at a reception coupler is generally unknown, so that there is a high possibility that a noise source is both at a transmission coupler and a reception coupler. Thus, the interference intensity of especially the side that is easy for an interference signal to be mixed needs to be decreased.

Thus, the portion of the reception coupler 101 that is not coupled with the transmission coupler 111 is covered with the metal plate 116 as in the present example embodiment so that an interference signal can be reduced.

According to the first example embodiment, the metal plate 106 is provided to face the portion of the reception coupler 101 that does not face the transmission coupler 111. According to a second example embodiment, a differential line, which is in the form of a coplanar waveguide with ground and further includes a ground line outside each transmission line coupler for wireless communication, is used as a transmission line coupler to further reduce an effect of exogenous noise. In the present example embodiment, mainly a difference from the first example embodiment will be described below.

Figure 5A:
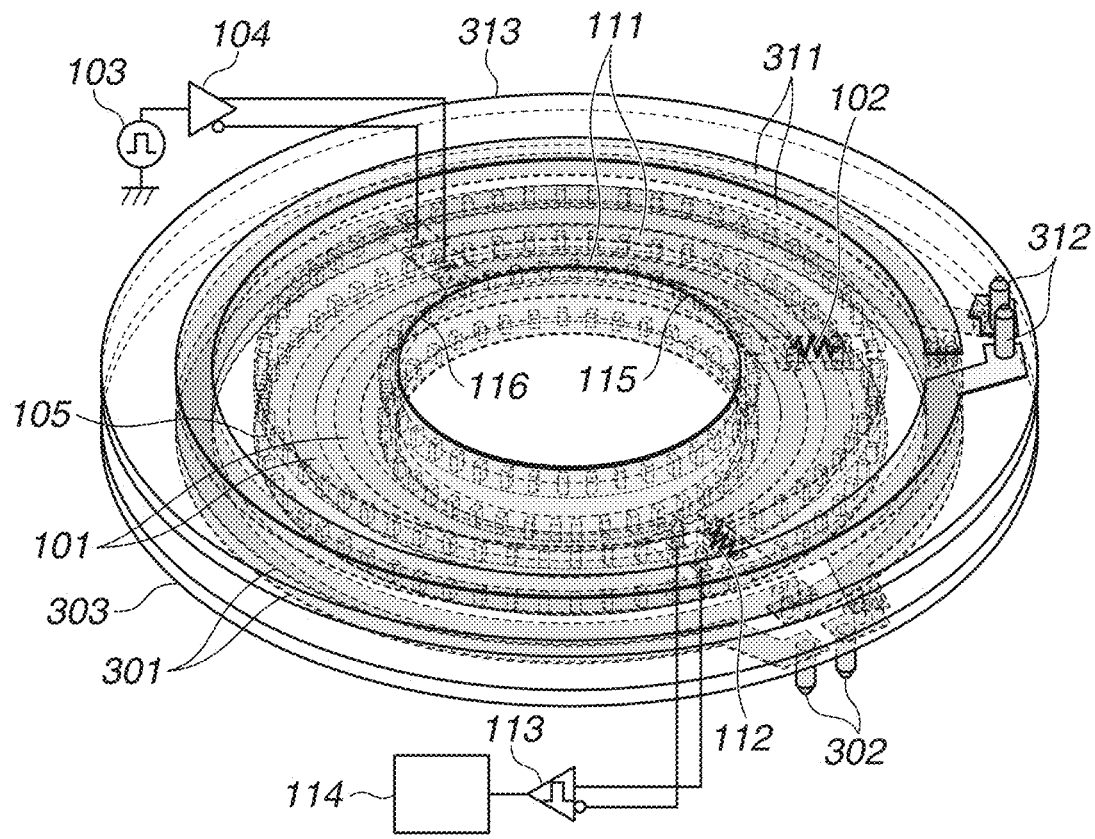
FIGS. 5A and 5B are diagrams each illustrating a system configuration of a wireless transmission system according to a second example embodiment.

FIG. 5A illustrates a system configuration of a wireless transmission system according to the present example embodiment. In FIG. 5A, each component similar to the corresponding component in FIG. 3 is given the same reference numeral as in FIG. 3. The wireless transmission system according to the present example embodiment in FIG. 5A is different from FIG. 3 in that a ground line is provided near an inner periphery and near an outer periphery of the transmission coupler 111 and the reception coupler 101. A ground line is also provided near an inner periphery and near an outer periphery of the metal plate 116, similarly to the transmission coupler 111 and the reception coupler 101. In the wireless transmission system illustrated in FIG. 5A, at least one of the reception coupler 101 and the transmission coupler 111 rotates about a center O of the reception coupler 101 as a rotation axis.

Figure 5B:
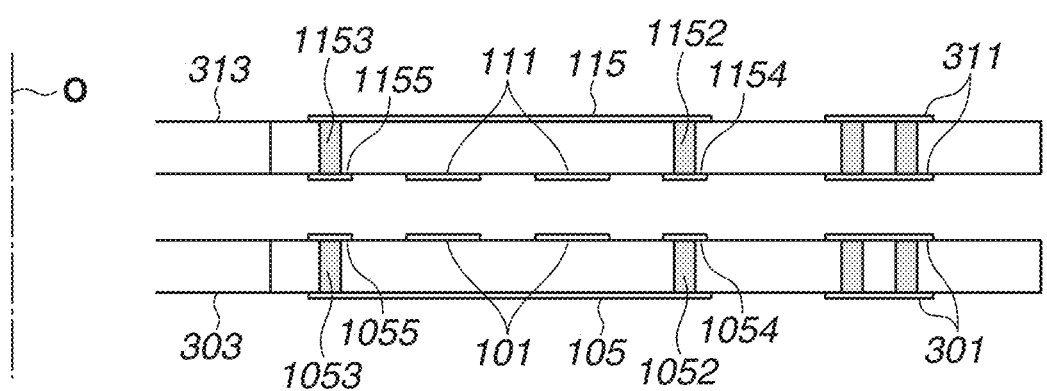

FIG. 5B is a cross-sectional view illustrating the wireless transmission system in FIG. 5A that is viewed from a direction perpendicular to a rotation axis O. A configuration in a case where the rotation axis O is on the left side in FIG. 5B will be described below as an example. Each component similar to the corresponding component in FIG. 5A is given the same reference number as in FIG. 5A.

Sandwiching the electric substrate 313, the transmission coupler 111 and the metal plate 115 as a ground face each other. Ground lines 1154 and 1155 are connected to the metal plate 115 through via-holes 1152 and 1153. A plurality of via-holes 1152 and 1153 is formed across an entire circumference of substantially outer and inner peripheries of the electric substrate 313, and the ground lines 1154 and 1155 and the metal plate 115 are connected together to decrease the impedance between the ground lines 1154 and 1155 and the metal plate 115 across the entire circumference. The transmission coupler 111 forms a coplanar waveguide with ground together with the ground lines 1154 and 1155 and the metal plate 115, and a coupler line width, a distance between lines, and a signal line-ground line distance are determined to realize a desired impedance. An example of a desired impedance is a differential of 100Ω. The power transmission coil 311 is arranged outside the ground line 1154.

The same applies to the reception coupler 101 side. Sandwiching the electric substrate 303, the reception coupler 101 and the metal plate 105 as a ground face each other. Ground lines 1054 and 1055 are connected to the metal plate 105 through via-holes 1052 and 1053. A plurality of via-holes 1052 and 1053 is formed across an entire circumference of substantially outer and inner peripheries of the electric substrate 303, and the ground lines 1054 and 1055 and the metal plate 105 are connected together to decrease the impedance between the ground lines 1054 and 1055 and the metal plate 105 across the entire circumference. The reception coupler 101 forms a coplanar waveguide with ground together with the ground lines 1054 and 1055 and the metal plate 105, and a coupler line width, a distance between lines, and a signal line-ground line distance are determined to realize a desired impedance. The power reception coil 301 is arranged outside the ground line 1054.

In the wireless transmission system according to the present example embodiment, as illustrated in FIG. 5A, by the metal plate 116, the portion of the reception coupler 101 that does not face the transmission coupler 111 is shielded, similarly the portion of the reception coupler 101 that faces the transmission coupler 111. This further reduces exogenous noise entering the reception coupler 101.

Figure 6:
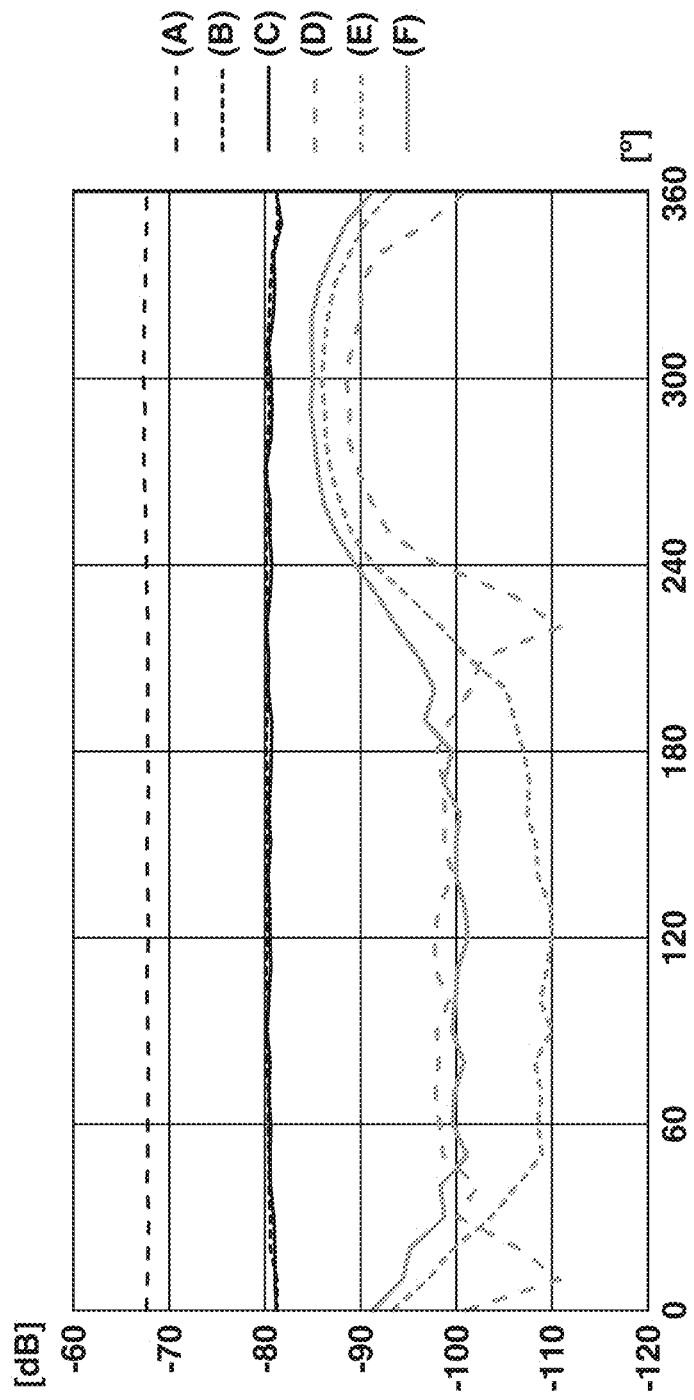
FIG. 6 is a graph illustrating wireless power interference intensities at a coupled end of the wireless transmission system according to the second example embodiment.
Figure 7A:
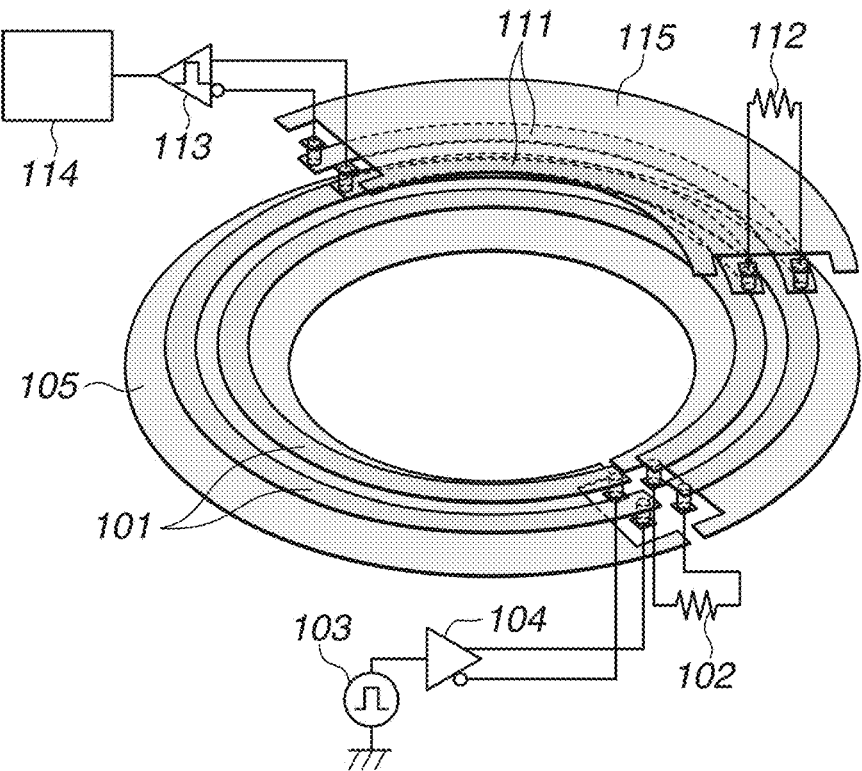
FIGS. 7A and 7B are diagrams each illustrating a system configuration of a wireless transmission system according to a conventional technique.
Figure 7B:
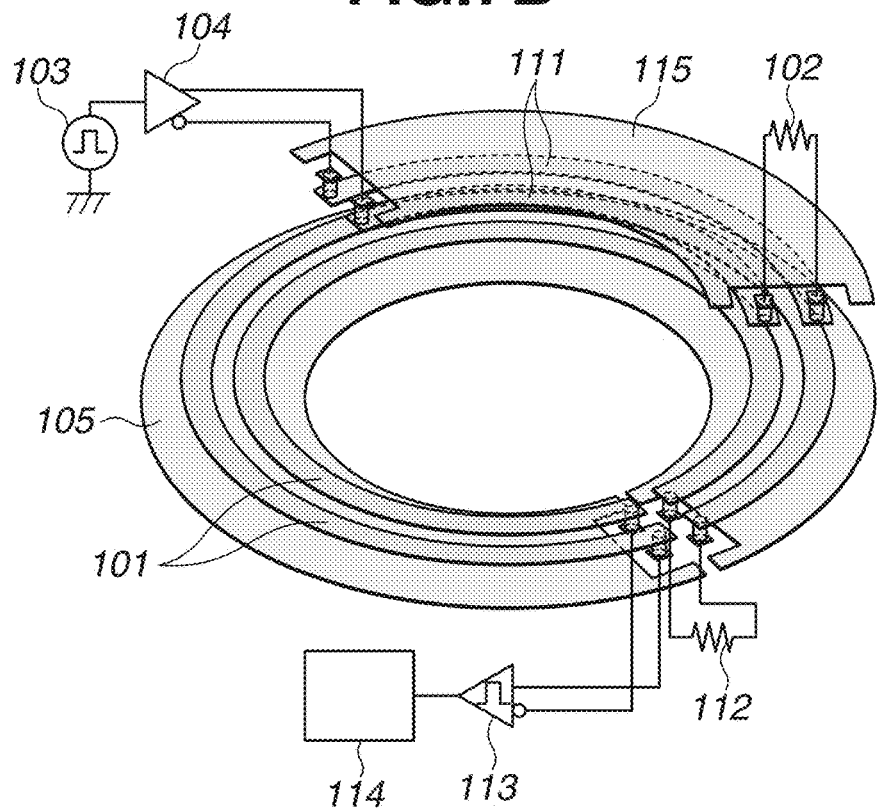

In FIG. 6, graphs (A) to (C) indicate intensities of interference signals output from the reception coupler 101 in the wireless transmission system illustrated in FIG. 5A. Each interference signal is 2 MHz alternating power input from the power-input pin 312. The vertical axis indicates an interference signal intensity, and the horizontal axis indicates a relative angle of the transmission coupler 111 and the reception coupler 101.

In FIG. 6, the graph (A) indicates interference intensities in a case where the metal plate 106 is absent in the wireless transmission system illustrated in FIG. 5A. The graph (B) is a graph indicating interference intensities in a case where the metal plate 116 is present in the wireless transmission system illustrated in FIG. 5A. The graph (C) is a graph indicating interference intensities in a case where the metal plate 106 is connected to the metal plate 115 to be a reference voltage of the transmission coupler 111 in the wireless transmission system illustrated in FIG. 5A.

As illustrated in FIG. 6, the interference intensities in the case where the metal plate 116 is absent in the wireless transmission system illustrated in FIG. 5A (graph (A)) are about −67.7 dB, whereas the interference intensities in the case where the metal plate 116 is present in the wireless transmission system illustrated in FIG. 5A (graph (B)) are about −80 dB to 81 dB. Thus, the interference signal is reduced by about 14 dB by providing the metal plate 116 to the portion of the reception coupler 101 that does not face the transmission coupler 111 in the wireless transmission system illustrated in FIG. 5A. Further, in the case where the metal plate 106 is connected to the metal plate 115 to be a reference voltage (graph (C)), the interference intensities are about −80 dB to 81 dB, and a level of the interference signal is about the same as that in the graph (B).

Further, in a comparison with the results according to the first example embodiment in FIG. 4, while the interference intensities in the graph (B) under the same conditions are about −66 dB in FIG. 4, the interference intensities in the graph (B) are −81 dB in FIG. 6. It is understood that the configuration according to the present example embodiment further reduces an interference signal.

Contrary to FIG. 5A, the graphs (D) to (F) in FIG. 6 indicate interference signal intensities in a case where a signal is input to the reception coupler 101 and the signal is output from the transmission coupler 111. The graph (D) indicates interference intensities in a case where the metal plate 116 is absent. The graph (E) indicates interference intensities in a case where the metal plate 116 is present. The graph (F) indicates interference intensities in a case where the metal plate 116 is connected to the metal plate 115 to be a reference voltage of the transmission coupler 111.

Since the metal plate 105 to be a reference potential of the reception coupler 101 covers nearly the entire circumference, the interference signal intensity is low.

In a case where a noise source is at a coupler that is arranged across the entire circumference as described above, an interference signal is reduced. However, whether a noise source is at a transmission coupler or at a reception coupler is generally unknown, so that there is a high possibility that a noise source is both at a transmission coupler and a reception coupler. Thus, the interference intensity of especially the side that is easy for an interference signal to be mixed needs to be decreased.

Thus, the portion of the reception coupler 101 that is not coupled with the transmission coupler 111 is covered with the metal plate 116 as in the present example embodiment so that an interference signal can be reduced.

As described above, according to the present example embodiment, a portion of a long transmission line coupler that does not face a short transmission line coupler in a wireless transmission system that wirelessly transmits not only a signal but also power is covered with a metal plate to reduce an interference signal. Use of a coplanar waveguide with ground as a transmission line coupler further reduces an interference signal. This prevents mixture of an external interference signal in wireless power transmission that generates noise in wireless communication, thereby suppressing a decrease in a SN ratio in wireless communication.

Further, while the interference signal of the power signal of the coil for wireless power transmission that is arranged outside the transmission line coupler is described as a noise source in the present example embodiment, the positional relationship between the coil for wireless power transmission and the transmission line coupler is not limited to that described above.

Furthermore, the noise source is not limited to the power signal of the coil for wireless power transmission and can be another noise source such as radiation noise in a motor or an electro-magnetic brake and noise in other wireless communication. The noise that interferes with wireless communication is not limited to the noise described above.

While the differential transmission lines are described as the couplers for use in communication in all the example embodiments, the couplers for use in communication are not limited to those described above and can consist of a single microstrip line or a coplanar waveguide with ground. Further, while the above-described couplers have an annular shape, a coupler having a different shape such as a linear shape can be employed. A metal plate that is the same as the metal plate 115 can be used as the metal plate 116. For example, in a case where the metal plate 115 is to cover a 180-degree region around a rotation axis of a coupler, an entire circumference around the rotation axis is covered using the other metal plate 115 as the metal plate 116. This realizes further cost reduction compared to a case where the metal plate 116 is manufactured separately from the metal plate 115.

Various embodiments of the present disclosure can suppress a decrease in a SN ratio that is caused by noise mixture in a case where a first transmission line coupler and a second transmission line coupler, which is shorter than the facing first transmission line coupler, communicate wirelessly with each other.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-191174, filed Nov. 17, 2020, which is hereby incorporated by reference herein in its entirety.

What is claimed is:

1. A wireless transmission system comprising:
   a first transmission line coupler having a first end connected to a transmission unit or a reception unit and another end connected to a termination resistor;
   a first ground to be a reference potential corresponding to the first transmission line coupler;
   a second transmission line coupler having a first end connected to a reception unit or a transmission unit and another end connected to a termination resistor, the second transmission line coupler being shorter than the first transmission line coupler and contactlessly facing the first transmission line coupler to communicate an electric signal with the first transmission line coupler using electric field and/or magnetic field coupling;
   a second ground to be a reference potential corresponding to the second transmission line coupler; and
   a metal plate covering at least a part of a portion of the first transmission line coupler, the portion not facing the second transmission line coupler,
   wherein, in a case where the transmission unit is connected to the first end of the first transmission line coupler, the reception unit is connected to the first end of the second transmission line coupler, whereas, in a case where the reception unit is connected to the first end of the first transmission line coupler, the transmission unit is connected to the first end of the second transmission line coupler.

2. The wireless transmission system according to claim 1, wherein the second ground and the metal plate are connected together.

3. The wireless transmission system according to claim 1, wherein the first transmission line coupler and the second transmission line coupler consist of a microstrip line.

4. The wireless transmission system according to claim 1, wherein each of the first transmission line coupler and the second transmission line coupler consist of a coplanar waveguide with ground.

5. The wireless transmission system according to claim 1, wherein each of the first transmission line coupler and the second transmission line coupler is a differential line.

6. The wireless transmission system according to claim 5, further comprising a differential transmission buffer connected to the transmission unit and configured to output a signal transmitted from the transmission unit as a differential signal,
   wherein the differential signal output from the differential transmission buffer is input to the first transmission line coupler or the second transmission line coupler.

7. The wireless transmission system according to claim 1, further comprising:
   a first coil fixed to the first transmission line coupler; and
   a second coil fixed to the second transmission line coupler,
   wherein wireless power transmission is performed between the first coil and the second coil.

8. The wireless transmission system according to claim 1, further comprising a comparator connected to the reception unit and configured to shape a waveform of an input signal,
   wherein a signal received from the first transmission line coupler or the second transmission line coupler is input to the comparator.

9. The wireless transmission system according to claim 1, wherein the first transmission line coupler has an annular shape.

10. The wireless transmission system according to claim 1, wherein the first transmission line coupler has a linear shape.

11. The wireless transmission system according to claim 1, wherein the second ground and the metal plate are the same metal plate.

* * * * *